(12) United States Patent
Jing

(10) Patent No.: US 12,680,590 B2
(45) Date of Patent: Jul. 14, 2026

(54) NONLINEAR INERTIA-BASED VIBRATION ISOLATION SYSTEM

(71) Applicant: City University of Hong Kong, Kowloon (HK)

(72) Inventor: Xingjian Jing, Sha Tin (HK)

(73) Assignee: City University of Hong Kong, Kowloon (HK)

( * ) Notice: Subject to any disclaimer, the term of this patent is extended or adjusted under 35 U.S.C. 154(b) by 497 days.

(21) Appl. No.: 18/482,518

(22) Filed: Oct. 6, 2023

(65) Prior Publication Data

US 2025/0116309 A1 Apr. 10, 2025

(51) Int. Cl.
*F16F 7/104* (2006.01)

(52) U.S. Cl.
CPC .......... *F16F 7/104* (2013.01); *F16F 2222/08* (2013.01); *F16F 2228/066* (2013.01)

(58) Field of Classification Search
CPC . F16M 11/22; F16F 7/104; F16F 15/04; F16F 15/067; F16F 2222/08; F16F 2228/066; F16F 2230/0052
USPC ........................................................ 188/380
See application file for complete search history.

(56) References Cited

U.S. PATENT DOCUMENTS

| | | | |
|---|---|---|---|
| 2005/0045796 A1* | 3/2005 | Kobayashi | A47C 1/02 248/636 |
| 2011/0199678 A1* | 8/2011 | Kuroi | G03B 21/58 359/461 |
| 2022/0322545 A1* | 10/2022 | Kapinos | H05K 5/0204 |

FOREIGN PATENT DOCUMENTS

| | | | |
|---|---|---|---|
| CN | 101865352 A | * 10/2010 | |
| CN | 110568710 A | * 12/2019 | G03B 21/58 |

OTHER PUBLICATIONS

C. Liu et al., Recent advances in micro-vibration isolation, Mech. Syst. Signal Process. 56-57 (2015) 55-80.

H. Li et al., Dynamic Property Optimization of a Vibration Isolator with Quasi-Zero Stiffness BT—Vibration Engineering for a Sustainable Future, in: S. Oberst, B. Halkon, J. Ji, T. Brown (Eds.), Springer International Publishing, Cham, 2021: pp. 289-295.

G. Yan et al., Bio-inspired toe-like structure for low-frequency vibration isolation, Mech. Syst. Signal Process. 162 (2022) 108010.

D. Leng et al., Neuro fuzzy logic control of magnetorheological elastomer isolation system for vibration mitigation of offshore jacket platforms, Ocean Eng. 253 (2022) 111293.

D. Leng et al., Analysis and design of a semi-active X-structured vibration isolator with magnetorheological elastomers, Mech. Syst. Signal Process. 181 (2022) 109492.

(Continued)

*Primary Examiner* — Robert A. Siconolfi
*Assistant Examiner* — San M Aung
(74) *Attorney, Agent, or Firm* — Norton Rose Fulbright US LLP

(57) ABSTRACT

An anti-vibration system is provided that includes a first support structure including a first support member and a second support member coupled to the first support member at a first joint such that the first and second support members are each rotatable about the first joint. The first support member and the second support member cross over one another at the first joint. A third support member is coupled to the first and second support members and is rotatable about an axis extending through the first joint. A first weighted member is disposed at a first end portion of the third support member.

20 Claims, 8 Drawing Sheets

(56)         References Cited

OTHER PUBLICATIONS

X. Jing, The X-structure/mechanism approach to beneficial nonlinear design in engineering, Appl. Math. Mech. 43 (2022) 979-1000.

S. Chen et al., Design and experiment of dual micro-vibration isolation system for optical satellite flywheel, Int. J. Mech. Sci. 179 (2020) 105592.

J. Yang et al., A semi-active suspension using a magnetorheological damper with nonlinear negative-stiffness component, Mech. Syst. Signal Process. 147 (2021) 107071.

M. Zhang et al., Switching logic-based saturated tracking control for active suspension systems based on disturbance observer and bioinspired X-dynamics, Mech. Syst. Signal Process. 155 (2021) 107611.

D. Ning et al., Active control of an innovative seat suspension system with acceleration measurement based friction estimation, J. Sound Vib. 384 (2016) 28-44.

X. Xiong et al., Internal resonance analysis of bio-inspired X-shaped structure with nonlinear vibration absorber, Mech. Syst. Signal Process. 185 (2023) 109809.

J.C. Ji et al., Vibration control based metamaterials and origami structures: A state-of-the-art review, Mech. Syst. Signal Process. 161 (2021) 107945.

L.W. Zhang et al., Dynamic reliability assessment of nonlinear structures using extreme value distribution based on L-moments, Mech. Syst. Signal Process. 159 (2021) 107832.

X.J. Jing et al., Frequency domain analysis for suppression of output vibration from periodic disturbance using nonlinearities, J. Sound Vib. 314 (2008) 536-557.

Y. Wang et al., Subharmonics and ultra-subharmonics of a bio-inspired nonlinear isolation system, Int. J. Mech. Sci. 152 (2019) 167-184.

G. Jiang et al., A novel bio-inspired multi-joint anti-vibration structure and its nonlinear HSLDS properties, Mech. Syst. Signal Process. 138 (2020) 106552.

Y. Zhang et al., Bursting oscillations in an isolation system with quasi-zero stiffness, Mech. Syst. Signal Process. 161 (2021) 107916.

Y. Chai et al., X-shaped mechanism based enhanced tunable QZS property for passive vibration isolation, Int. J. Mech. Sci. 218 (2022) 107077.

X. Jing et al., In-situ adjustable nonlinear passive stiffness using X-shaped mechanisms, Mech. Syst. Signal Process. 170 (2022) 108267.

I. Kovacic et al., A study of a nonlinear vibration isolator with a quasi-zero stiffness characteristic, J. Sound Vib. 315 (2008) 700-711.

Z. Zhai et al., In situ stiffness manipulation using elegant curved origami, Sci. Adv. 6 (2020). https://doi.org/10.1126/sciadv.abe2000.

M.Q. Niu et al., Nonlinear vibration isolation via a compliant mechanism and wire ropes, Nonlinear Dyn. 107 (2022) 1687-1702.

B. Yan et al., A bistable vibration isolator with nonlinear electro-magnetic shunt damping, Mech. Syst. Signal Process. 136 (2020) 106504.

B. Yan et al., Theoretical modeling and experimental analysis of nonlinear electromagnetic shunt damping, J. Sound Vib. 471 (2020) 115184.

H. Ding et al., Nonlinear vibration isolation for fluid-conveying pipes using quasi-zero stiffness characteristics, Mech. Syst. Signal Process. 121 (2019) 675-688.

Q. Wang et al., Design and experimental investigation of ultra-low frequency vibration isolation during neonatal transport, Mech. Syst. Signal Process. 139 (2020) 106633.

X.J. Jing et al., Nonlinear influence in the frequency domain: Alternating series, Syst. Control Lett. 60 (2011) 295-309.

X.J. Jing et al., Frequency domain analysis of a dimensionless cubic nonlinear damping system subject to harmonic input, Nonlinear Dyn. 58 (2009) 469-485.

X. Sun et al., Analysis and design of a nonlinear stiffness and damping system with a scissor-like structure, Mech. Syst. Signal Process. 66 (2016) 723-742.

Y. Wang et al., Nonlinear stiffness and dynamical response characteristics of an asymmetric X-shaped structure, Mech. Syst. Signal Process. 125 (2019) 142-169.

Y. Chai et al., A compact X-shaped mechanism based 3-DOF anti-vibration unit with enhanced tunable QZS property, Mech. Syst. Signal Process. 168 (2022) 108651.

X. Feng et al., Human body inspired vibration isolation: Beneficial nonlinear stiffness, nonlinear damping & nonlinear inertia, Mech. Syst. Signal Process. 117 (2019) 786-812.

J. Bian et al., Analysis and design of a novel and compact X-structured vibration isolation mount (X-Mount) with wider quasi-zero-stiffness range, Nonlinear Dyn. 101 (2020) 2195-2222.

X. Chong et al., Vibration isolation properties of the nonlinear X-combined structure with a high-static and low-dynamic stiffness: Theory and experiment, Mech. Syst. Signal Process. 179 (2022) 109352.

Z. Zhu et al., Nonlinear Inertia and its Effect within an X-shaped Mechanism—Part I: Modelling & Nonlinear Properties. Submitted Apr. 2023.

R.A. Ibrahim, Recent advances in nonlinear passive vibration isolators, J. Sound Vib. 314 (2008) 371-452.

X. Feng et al., Bio-inspired anti-vibration with nonlinear inertia coupling, Mech. Syst. Signal Process. 124 (2019) 562-595.

* cited by examiner

NONLINEAR INERTIA-BASED VIBRATION ISOLATION SYSTEM

TECHNICAL FIELD

The present disclosure relates generally to vibration suppression. More specifically, the present disclosure provides a nonlinear inertia-based anti-vibration system.

BACKGROUND

Vibration problems are often considered a negative factor in many engineering systems. Detrimental vibrations may significantly affect the accuracy of precision equipment, reduce service life of instruments, and cause structural fatigue damage. As such, the unwanted vibrations need to be controlled within a rational and acceptable range in engineering systems. Various vibration suppression systems attempt to address this issue, such as traditional linear passive vibration isolators, active/semi-active isolation elements, and nonlinear quasi-zero stiffness (QZS) passive isolators. There remains room for improvement, however, in the performance of typical vibration suppression systems.

SUMMARY

The present disclosure provides a new and innovative anti-vibration system that demonstrates nonlinear inertia forms. In various aspects, the anti-vibration system is adjustable so as to demonstrate multiple different nonlinear inertia forms. Each of the different nonlinear inertia forms has a different nonlinear influence on the dynamic vibration suppression response of the anti-vibration system. The present disclosure also provides a new and innovative method of testing different nonlinear inertia.

In an example, an anti-vibration system includes a first support structure including a first support member and a second support member coupled to the first support member at a first joint such that the first and second support members are each rotatable about the first joint. The first support member and the second support member cross over one another at the first joint. A third support member is coupled to the first and second support members and is rotatable about an axis extending through the first joint. A first weighted member is disposed at a first end portion of the third support member.

In another example, an anti-vibration system includes an X-shaped support structure that includes a first support member and a second support member. A third support member is rotatably coupled to the X-shaped support structure at a crossover point between the first and second support members. A first weighted member is disposed at a first end portion of the third support member, and a second weighted member is disposed at a second end portion of the third support member.

In another example, an anti-vibration system includes a plurality of support members, a first weighted member disposed at a first end portion of a first support member of the plurality support members such that the first weighted member is rotatable relative to the first support member, and a second weighted member disposed at a second end portion of the first support member such that the second weighted member is rotatable relative to the second support member. The plurality of support members are configured in an adjustable arrangement such that the nonlinear inertia generated by the anti-vibration system is adjustable.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Figure 1:
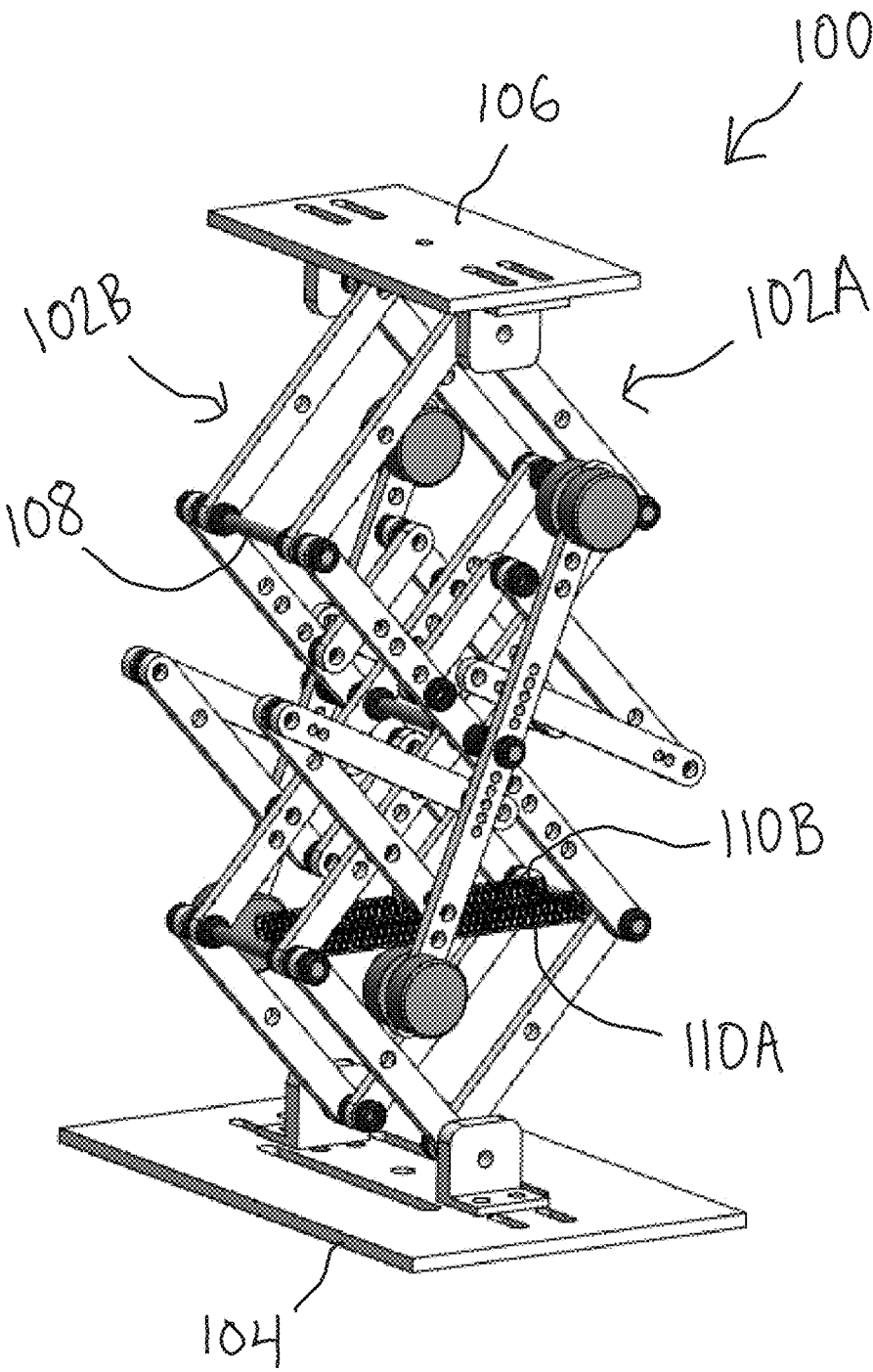
FIG. 1 is a perspective view of an example anti-vibration system, according to an aspect of the present disclosure.

A new and innovative anti-vibration system is provided that is capable of demonstrating nonlinear inertia forms. The anti-vibration system includes an arrangement of support members that allow for excitation displacements and tunable inertia ratios that enable the anti-vibration system to produce various different types of nonlinear inertia. For example, the anti-vibration system includes an inertial structure formed by weighted members coupled to opposing ends of a support member. As the anti-vibration system compresses and decompresses to suppress vibrations, the inertial structure rotates about an axis such that inertial forces (e.g., nonlinear inertial forces) are generated as the weighted members are in motion. The inertial forces must then be overcome when forcing the weighted members in motion to change direction, which produces an inertial effect in a nonlinear way such that the equivalent mass/inertia of the vibration isolation system becomes larger or smaller, adaptively changing with input vibration excitation. The nonlinear inertial effect consequently leads to much improved vibration isolation performance, because a larger equivalent mass is beneficial for vibration isolation. In various aspects, the arrangement of support members can be adjusted, such as by adjusting a distance between two rotation joints, to alter the type of nonlinear inertia that the anti-vibration system produces. Embodiments of the anti-vibration system may be used in a variety of applications, such as remote sensing satellites, aviation seat frames, medical or cargo transportation, suspension systems of a vehicle, etc.

In any of the embodiments of the anti-vibration system, the various parameters of the anti-vibration system (e.g., rod segment lengths, spring stiffness, initial assembly angles, spring connection parameters, etc.) can be selected (e.g., tuned) to flexibly meet various requirements of the different applications of the anti-vibration system. For instance, different applications of the anti-vibration system can have their own specific requirements, such as a working displacement range, a height of the vibration isolation unit, or a payload and frequency range of external excitation. In an example, initial assembly angles can be selected, and then by combining the selected initial assembly angles with a desired height of the working environment of the anti-vibration system, the rod segment lengths can be determined. In another example, the stiffness parameters of the springs in the anti-vibration system can be determined by adjusting the spring stiffness until the anti-vibration system satisfies the requirements of the desired payload and working displacement range. In another example still, the rod segment lengths and spring connection parameters can be adjusted to obtain a desired loading capacity and QZS zone requirements.

Joints that facilitate rotation of two coupled components with respect to one another are described herein. Any suitable joint that connects two components and enables such movement may be used. For example, a bar positioned through respective openings in each of the two components is one such suitable joint.

As used herein, a resilient member is an elastic component that repeatedly stores and releases mechanical energy. For example, a resilient member may be any suitable spring (e.g., coil spring, extension/tension spring, machined spring, etc.).

FIG. 1 shows a perspective view of an example anti-vibration system 100. In this example, anti-vibration system 100 includes a first side 102A of support members and a second side 102B of support members that opposes the first side 102A. While only the first side 102A of the anti-vibration system 100 will be described in detail in connection with the following FIGS. 2 to 6, it will be appreciated that the second side 102B of the anti-vibration system 100 may be a mirror image of the first side 102A. In at least some aspects, one or more support bars 108 may extend between the first side 102A and the second side 102B at respective rotation joints between two support members to provide stability or support to the anti-vibration system 100. For example, a support bar 108 may extend between any two directly opposing rotation joints between the first side 102A and the second side 102B. In various aspects, anti-vibration system 100 includes at least one resilient member. The at least one resilient member can provide a damping effect to anti-vibration system 100. FIG. 1 illustrates an example of anti-vibration system 100 including a resilient member 110A and a resilient member 110B. In one example, resilient member 110A or resilient member 110B may have a stiffness of 10 N/mm, though the stiffness can be tuned to any desired values depending on the application.

Each of the first side 102A and the second side 102B may be coupled to the first base portion 104 and a second base portion 106. In some aspects, the first base portion 104 or the second base portion 106 may be coupled to another structure. For example, in a vehicular application, the first base portion 104 may be coupled to a vehicle frame while the second base portion 106 may be coupled to a vehicle seat. In other aspects, the first base portion 104 or the second base portion 106 may integrated with a structure. For example, in the same vehicular application, the first base portion 104 may be a portion of the vehicular frame while the second base portion 106 may be a portion of the vehicle seat.

Figure 2:
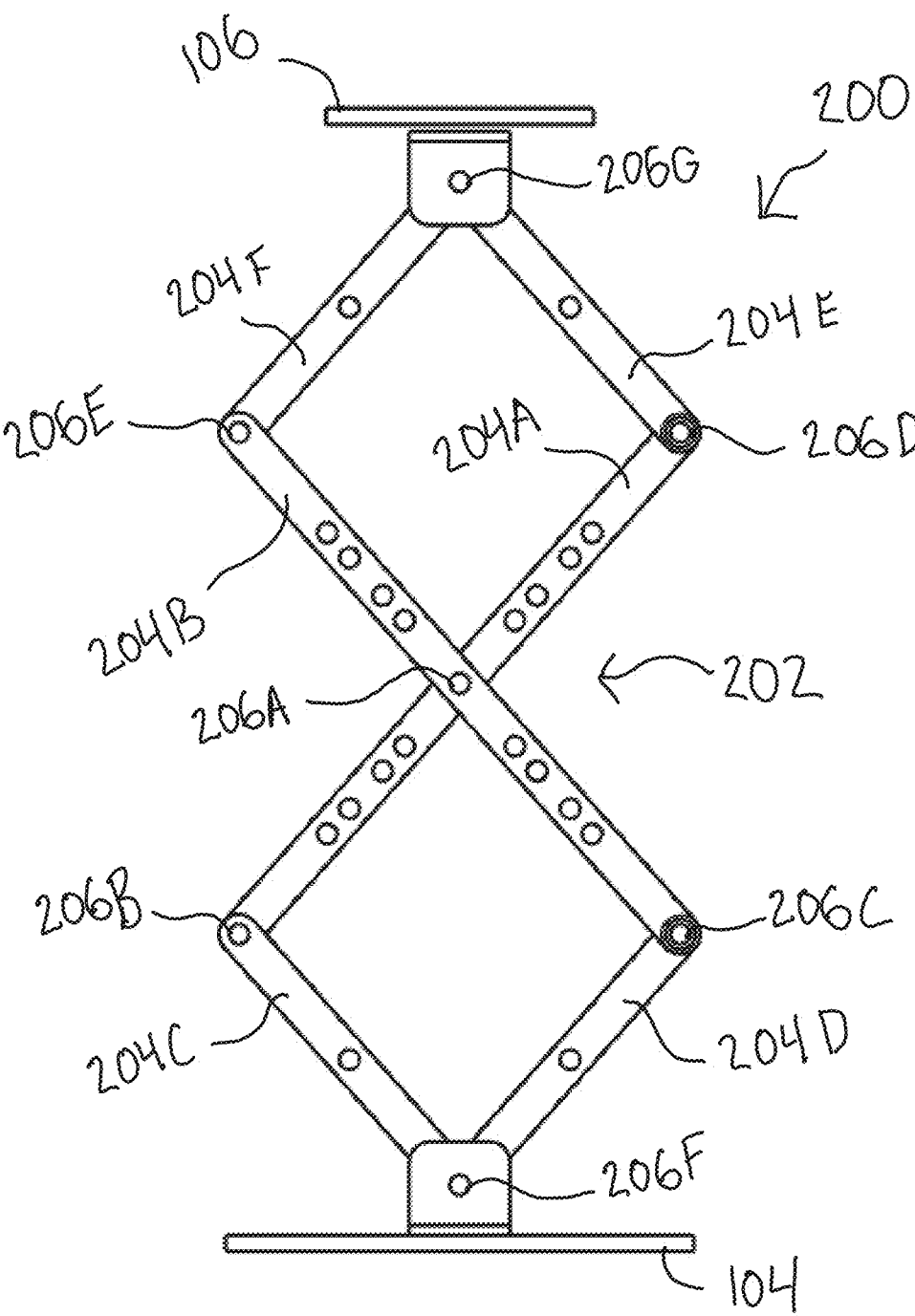
FIG. 2 is a side view of a first support structure of the anti-vibration system of FIG. 1, according to an aspect of the present disclosure.

FIG. 2 shows a side view of a first support structure 200 of anti-vibration system 100. First support structure 200 includes an X-shaped support structure 202 that is formed by a support member 204A and a support member 204B. Support member 204A and support member 204B rotatably coupled at a joint 206A. As shown in FIG. 2, support member 204A and support member 204B cross over one another at joint 206A to thereby form the X-shaped structure 202. Support member 204A is rotatably coupled to a support member 204C at a joint 206B. Support member 204B is rotatably coupled to a support member 204D at a joint 206C. Each of the support member 204C and the support member 204D are rotatably coupled at a joint 206F. Support member 204A is further rotatably coupled to a support member 204E at a joint 206D. Support member 204B is further rotatably coupled to a support member 204F at a joint 206E. Each of the support member 204E and the support member 204F are rotatably coupled at a joint 206G.

Figures 3A, 3B, 3C:
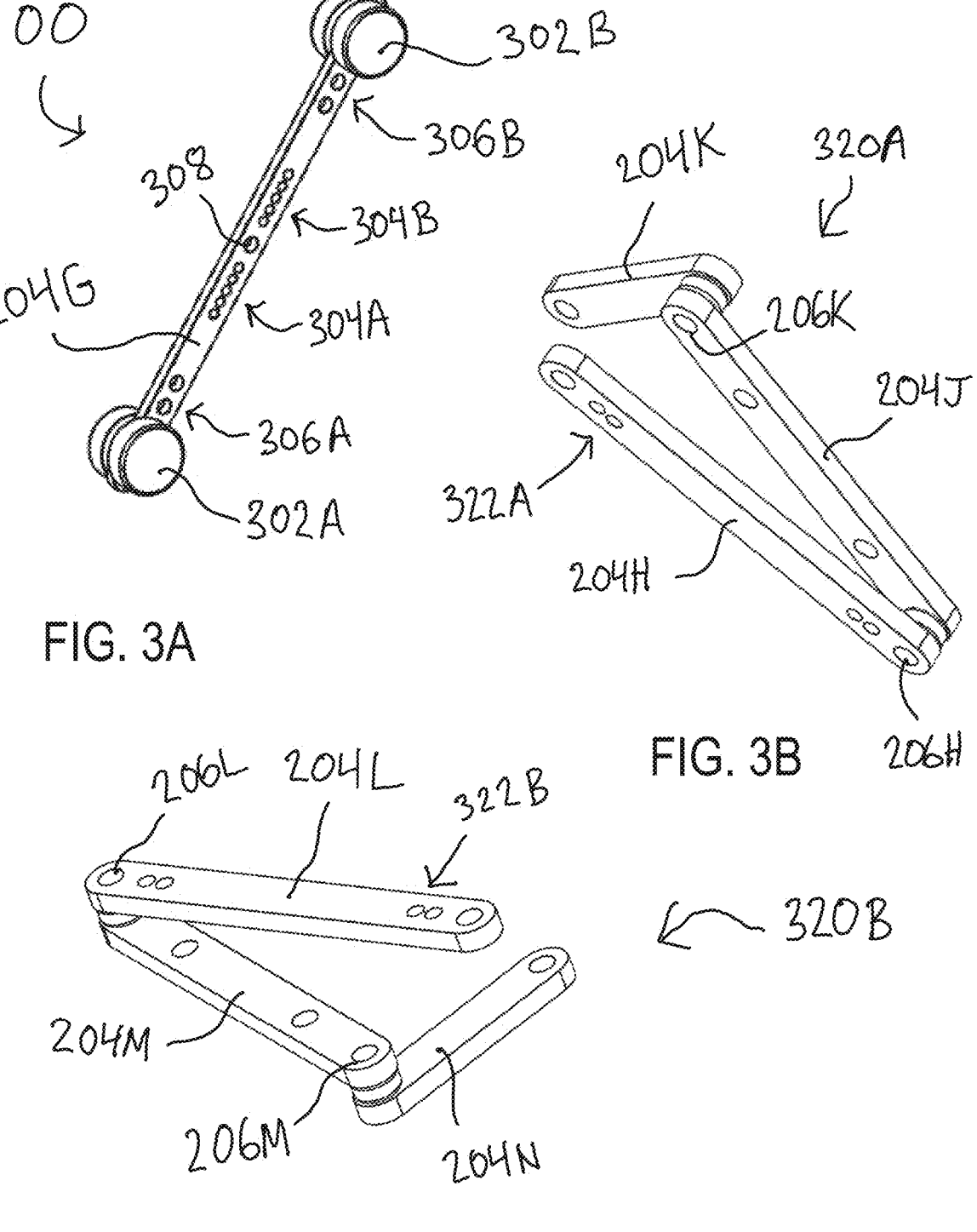
FIG. 3A is a perspective view of a support member having weighted members of the anti-vibration system of FIG. 1, according to an aspect of the present disclosure.
FIGS. 3B and 3C are perspective views of second and third support structures of the anti-vibration system of FIG. 1, according to an aspect of the present disclosure.

FIG. 3A shows an example inertial structure 300. Inertial structure 300 includes a support member 204G. In various aspects, inertial structure 300 includes a weighted member 302A and a weighted member 302B. Weighted member 302A may be rotatably coupled to one end portion of support member 204G. Weighted member 302B may be rotatably coupled to a second, opposing end portion of support member 204G. Stated differently, each of weighted members 302A and 302B is able to rotate relative to support member 204G when coupled to support member 204G. The weights of weighted member 302A and weighted member 302B can be adapted based on the application. In an example, weighted member 302A or weighted member 302B may each weigh 3 kilograms (kg). In various aspects, weighted member 302A or weighted member 302B may have a weight that is less than 10% of a payload being utilized with anti-vibration system 100. In various aspects, support member 204G may include a first set of openings 304A and a second set of openings 304B. The sets of openings 304A and 304B enable adjustments to anti-vibration system 100, which will be described in more detail below. While each of the sets of openings 304A and 304B are shown in the example of FIG. 3A as including five openings, each of the sets of openings 304A and 304B may include greater or less than five openings in other examples.

In various aspects, support member 204G may include a third set of openings 306A and a fourth set of openings 306B. The third set of openings 306A enables weighted member 302A to be coupled to support member 204G at various positions along support member 204G. The fourth set of openings 306B enables weighted member 302B to be coupled to support member 204G at various positions along support member 204G. While each of the sets of openings 306A and 306B are shown in the example of FIG. 3A as including three openings (weighted members 302A and 302B are disposed through a non-visible opening), each of the sets of openings 306A and 306B may include greater or less than three openings in other examples. Support member 204G includes an opening 308 to enable support member 204G to be rotatably coupled to the first support structure 200 at joint 206.

FIG. 3B shows a second support structure 320A. Second support structure 320A includes a support member 204H rotatably coupled to a support member 204J at a joint 206H. Second support structure 320A further includes a support member 204K rotatably coupled to support member 204J at a joint 206K. Support member 204H includes a set of openings 322A that enable adjustments to anti-vibration system 100, which will be described in more detail below. While the set of openings 322A as shown in the example of FIG. 3B include two openings, the set of openings 322A may include greater than two openings in other examples.

FIG. 3C shows a third support structure 320B. Third support structure 320B includes a support member 204L rotatably coupled to a support member 204M at a joint 206L. Third support structure 320B further includes a support member 204N rotatably coupled to support member 204M at a joint 206M. Support member 204L includes a set of openings 322B that enable adjustments to anti-vibration system 100, which will be described in more detail below. While the set of openings 322B as shown in the example of FIG. 3C include two openings, the set of openings 322B may include greater than two openings in other examples.

Figure 4:
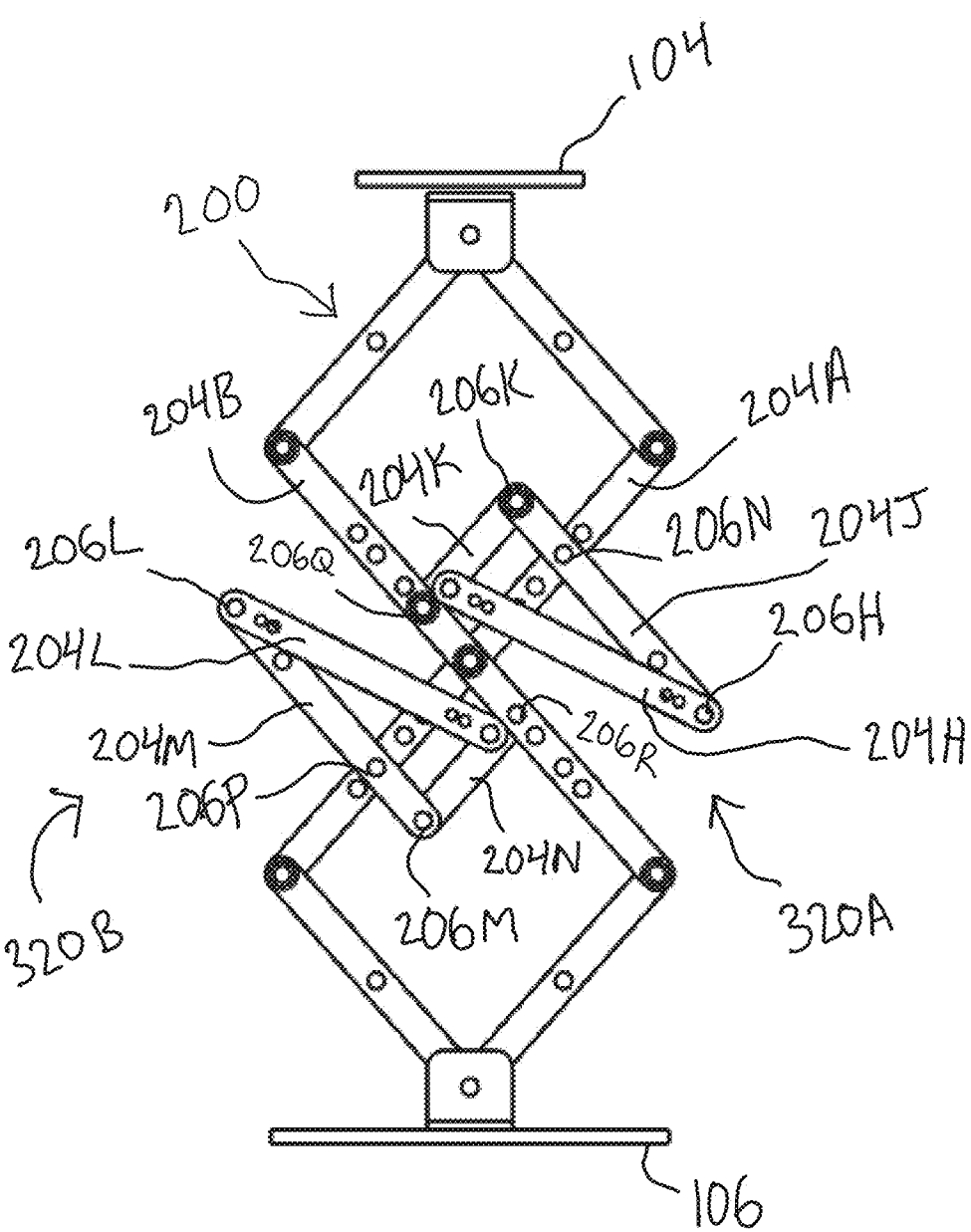
FIG. 4 is a side view of the second and third support structures of FIGS. 3B and 3C coupled to the first support structure of FIG. 2, according to an aspect of the present disclosure.

FIG. 4 shows the second support structure 320A and third support structure 320B coupled to support structure 200. Support member 204K of second support structure 320A is rotatably coupled to support member 204B at a joint 206Q. Support member 204J of second support structure 320A is rotatably coupled to support member 204A at a joint 206N. Support member 204N is rotatably coupled to support member 204B at a joint 206R. Support member 204M is rotatably coupled to support member 204A at a joint 206P.

Figure 5:
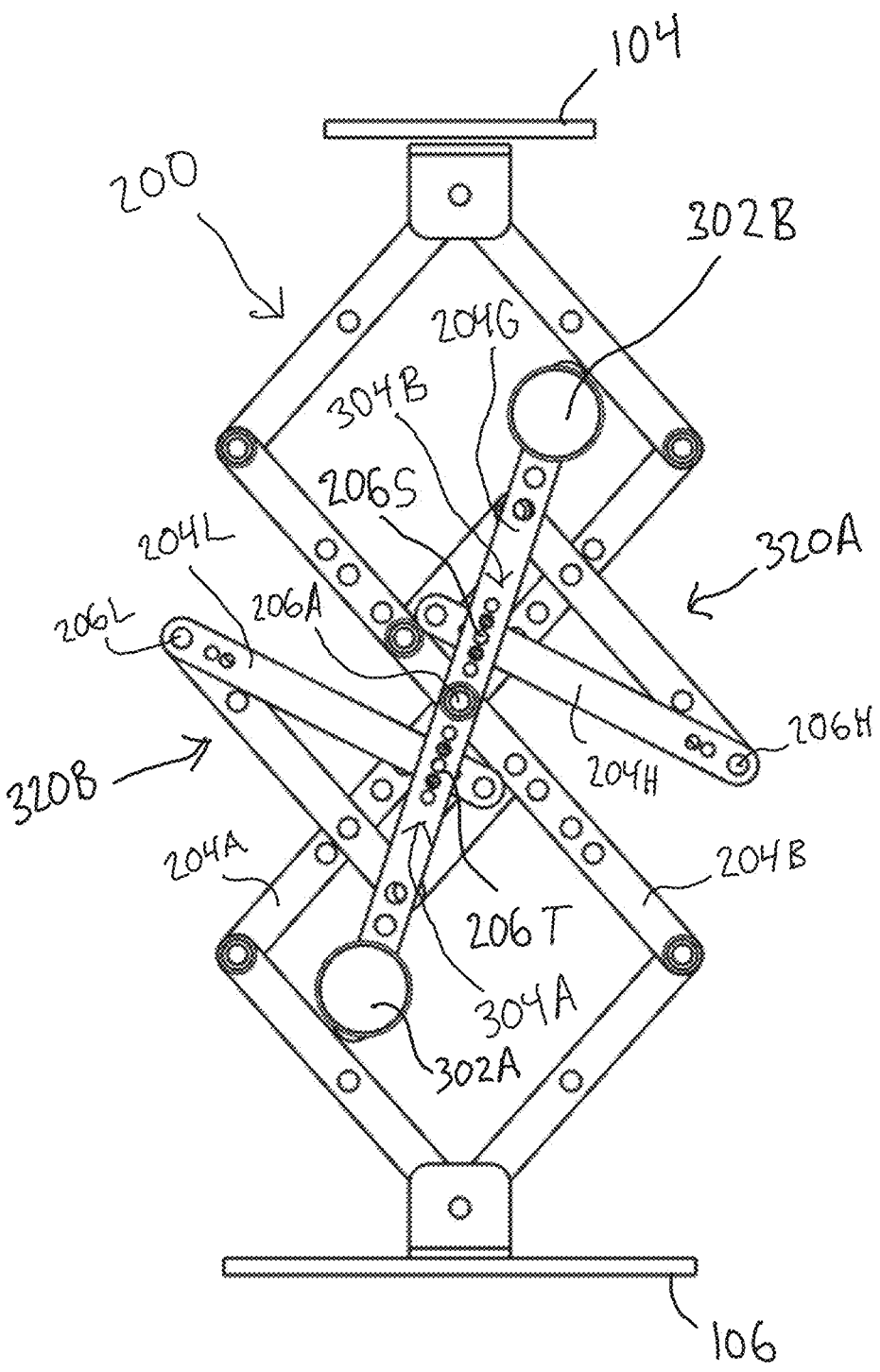
FIG. 5 is a side view of the support member of FIG. 3A coupled to the first support structure of FIG. 2 and the second and third support structures of FIGS. 3B and 3C, according to an aspect of the present disclosure.

FIG. 5 shows support member 204G of inertial structure 300 rotatably coupled to first support structure 200, second support structure 320A, and third support structure 320B. Support member 204G is rotatably coupled to support member 204A and support member 204B at joint 206A. Support member 204G is rotatably coupled to support member 204H of second support structure 320A at a joint 206S. Support member 204G can be rotatably coupled to support member 204H at joint 206S via any of the openings in the second set of openings 304B of support member 204G and any of the openings in the set of openings 322A of support member 204H. The adjustability of the location of joint 206S relative to support member 204G and support member 204H enables changing a length of support member 204G between joint 206A and joint 206S and a length of support member 204H between joint 206H and the joint 206S, which can each affect the inertial form type generated by anti-vibration system 100. Support member 204G is rotatably coupled to support member 204L of third support structure 320B at a joint 206T. Support member 204G can be rotatably coupled to support member 204L at joint 206T via any of the openings in the first set of openings 304A of support member 204G and any of the openings in the set of openings 322B of support member 204L. The adjustability of the location of joint 206T relative to support member 204G and support member 204L enables changing a length of support member 204G between joint 206A and joint 206T and a length of support member 204L between joint 206L and joint 206T, which can each affect the inertial form type generated by anti-vibration system 100.

Figure 6:
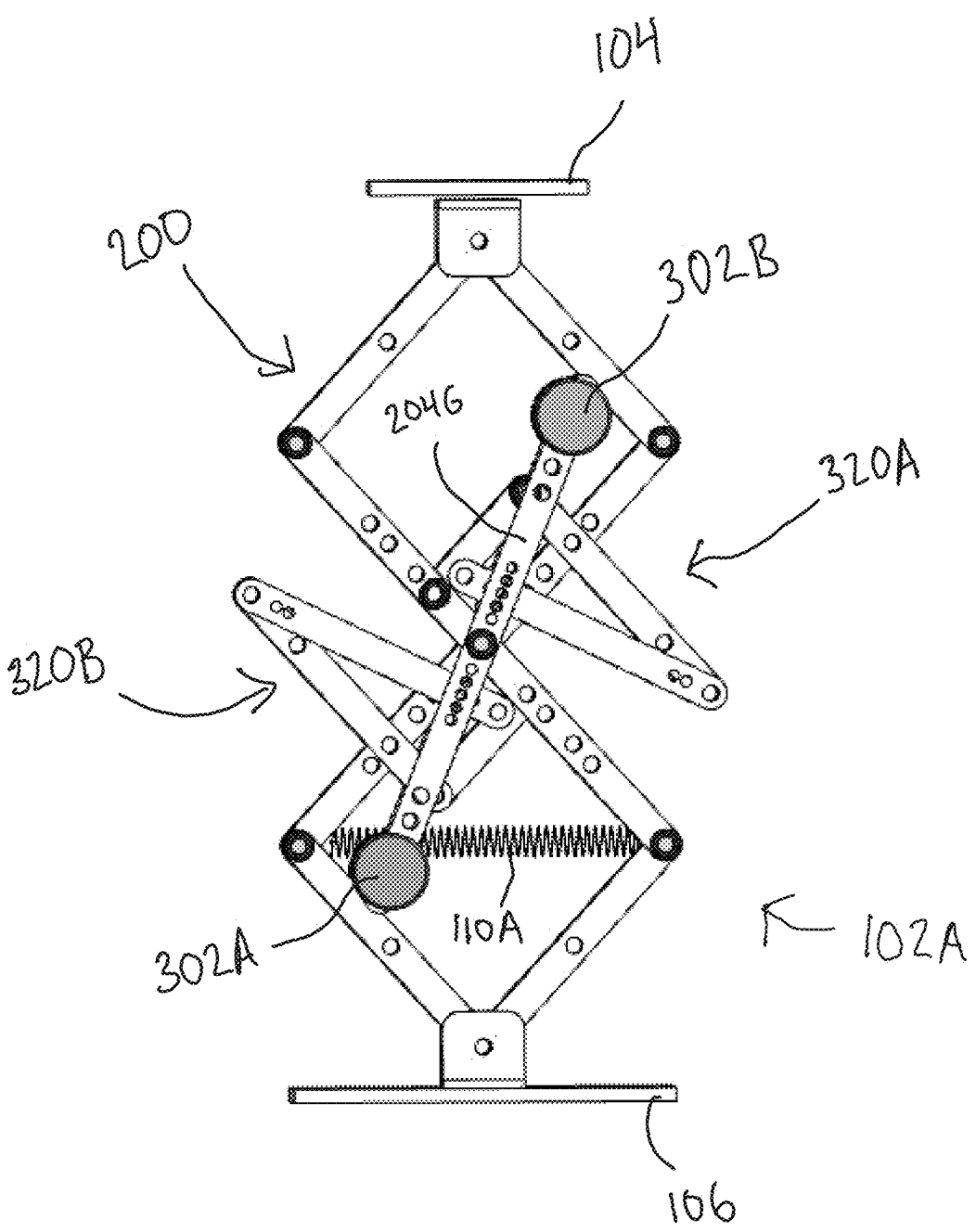
FIG. 6 shows the side view of FIG. 5 including a resilient member, according to an aspect of the present disclosure.
Figure 7:
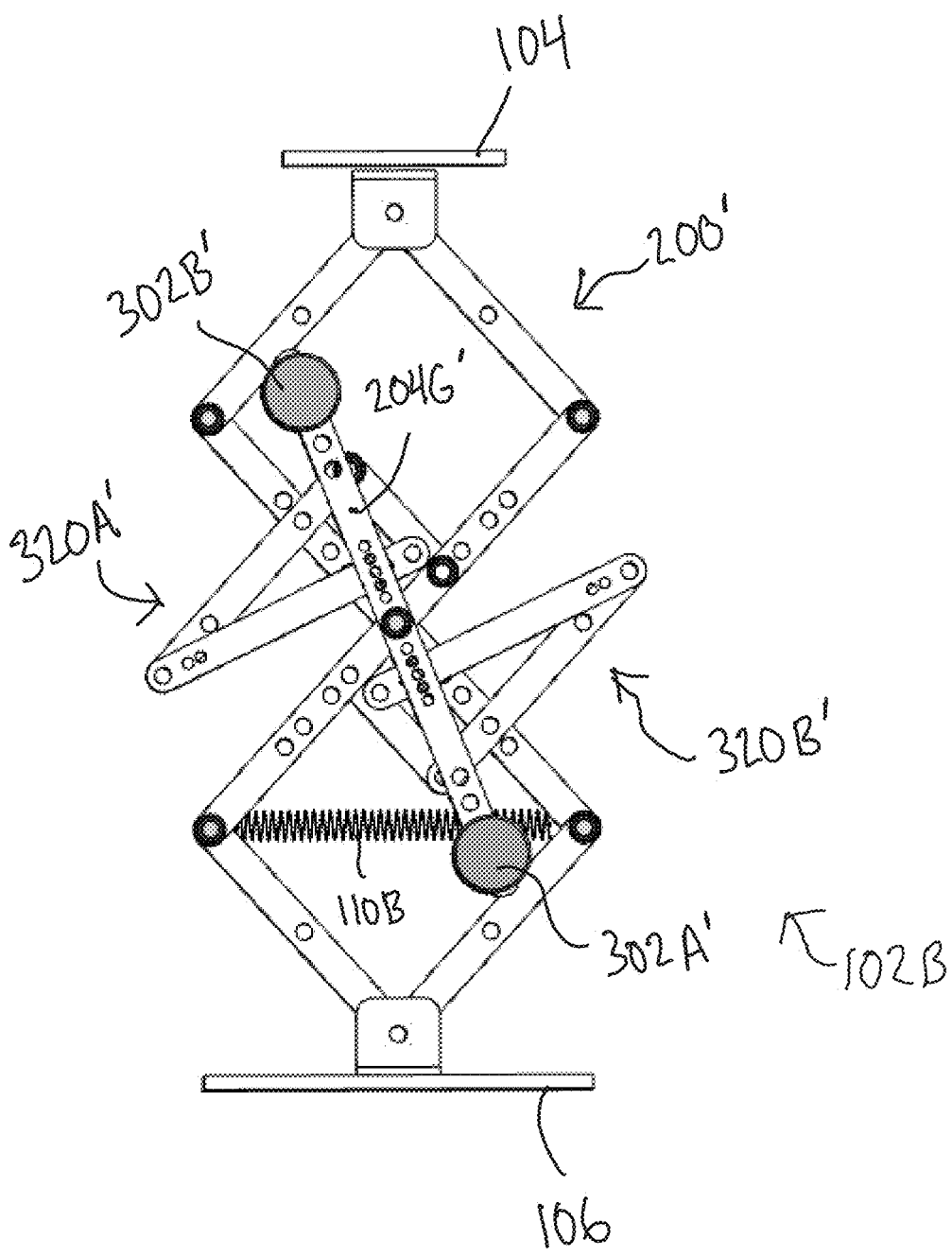
FIG. 7 is a side view of the anti-vibration system of FIG. 1 that is opposite the side view shown in FIGS. 2 and 4-6, according to an aspect of the present disclosure.

FIG. 6 is a side view of anti-vibration system 100 showing first side 102A, which includes resilient member 110A. FIG. 7 is side view of anti-vibration system 100 showing second side 102B, which includes resilient member 110B. As stated above, second side 102B is a mirror image of first side 102A and includes similar components, which is indicated in FIG. 7 by components with the same reference numerals as first side 102A except with a prime symbol when the component of second side 102B is a separate and distinct component from first side 102A. For example, second side 102B includes a support structure 200' which is similar to support structure 200.

In use, portions of first base portion 104 move towards and away from second base portion 106 in response to force(s) applied to anti-vibration system 100 and a relaxation of such force(s). For example, a mass (e.g. cargo, an individual, etc.) may rest on base portion 104, which compresses base portion 104 towards base portion 106, and as the mass moves within space (e.g. a bump on a road causes cargo in a truck to move), base portion 104 moves away from and towards base portion 106. In some aspects, portions of base portion 106 may similarly move towards and away from base portion 104. Support members 204A-N rotate about joints 206A-T to enable the change in distance between portions of first base portion 104 and second base portion 106. During rotation of support members 204A-N, support member 204G of inertial structure 300 rotates in a first direction about joint 206A, thereby translating weighted members 302A and 302B on the end portions of support member 204G. The weighted members 302A and 302B in motion produce inertial forces, which then must be overcome when support members 204H and 204L force support member 204G to change rotation direction to a second, opposing direction about joint 206A, which produces an inertial effect in a nonlinear way such that the equivalent mass/inertia of the anti-vibration system 100 becomes larger or smaller, adaptively changing with input vibration excitation. The nonlinear inertial effect consequently leads to much improved vibration isolation performance, because a larger equivalent mass is beneficial for vibration isolation.

Figure 8A:
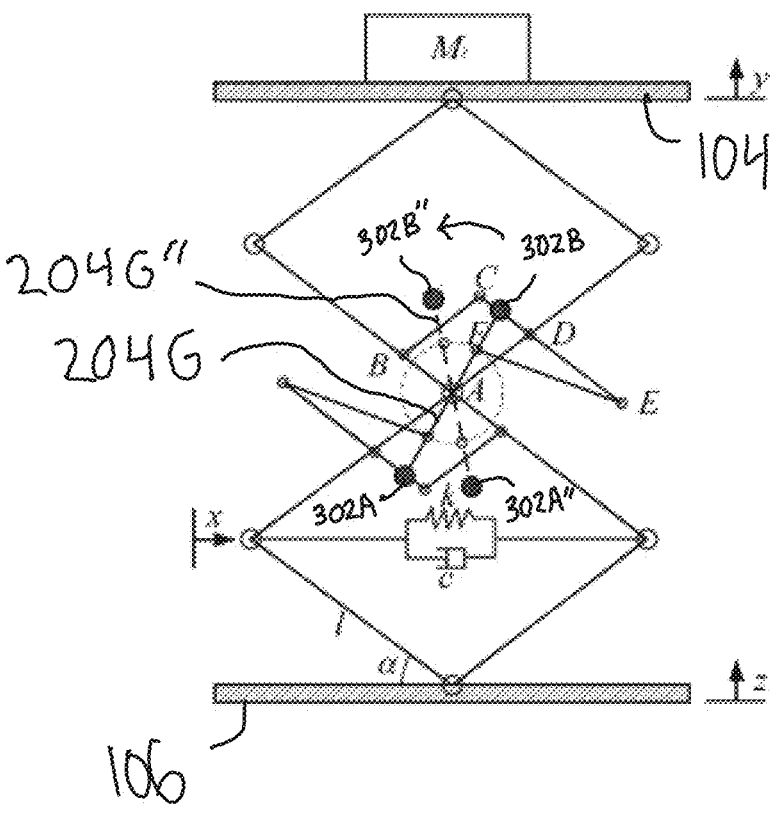
FIG. 8A is a schematic representation of a side view of the anti-vibration system of FIG. 1, according to an aspect of the present disclosure.
Figure 8B:
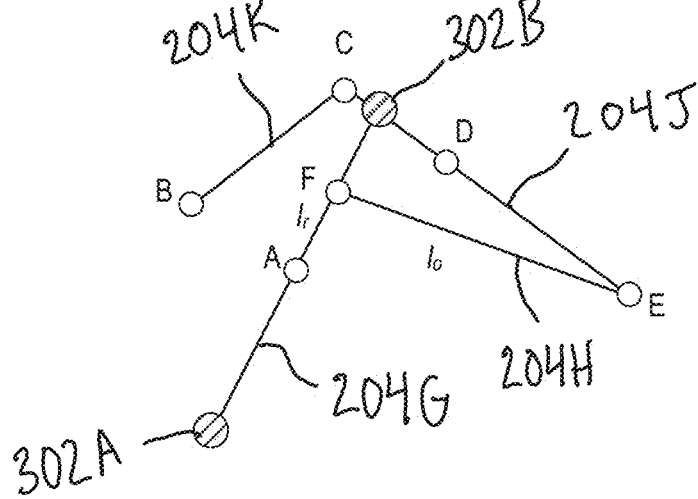
FIG. 8B is a portion of the schematic representation of FIG. 8A in isolation, according to an aspect of the present disclosure.

FIGS. 8A and 8B are schematics of anti-vibration system 100. Specifically, FIG. 8A is a schematic of a side view of anti-vibration system 100 with a mass $M_1$ resting on base portion 104, and FIG. 8B is a schematic of a portion of anti-vibration system 100 in isolation. In each of FIGS. 8A and 8B, joint 206A is indicated as "A", joint 206Q is indicated as "B", joint 206K is indicated as "C", joint 206N is indicated as "D", joint 206H is indicated as "E", and joint 206S is indicated as "F". FIG. 8A shows an example representation of inertial structure 300 rotating about joint 206A. Specifically, support member 204G is shown as a solid line in a first position with weighted members 302A and 302B. After rotation to a second position, support member 204G is shown as a dashed line and indicated as support member 204G" with weighted members 302A" and 302B". The movement of weighted member 302B in the first position to weighted member 302B" in the second position as indicated by the arrow in FIG. 8B produces inertial force, and similarly for the movement of weighted member 302A in the first position to weighted member 302A" in the second position. The inventors found through a geometric analysis of the forces of the anti-vibration system 100 that the anti-vibration system 100 produces four nonlinear forces, namely, nonlinear inertia force, nonlinear inertia incurred conservative force, nonlinear stiffness force, and nonlinear damping force.

The inventors found that, in at least some aspects, the nonlinear inertia type that inertial structure 300 of anti-vibration system 100 produces can depend on a length $l_r$ of support member 204G between joint 206A and joint 206S

7 and length $1_o$ of support member 204H between joint 206H and joint 206S. For example, the nonlinear inertia type produced can be based on a ratio $$\frac{l_o}{l_r}.$$

As described above, length $1_r$ can be adjusted by adjusting the location of joint 206S via the set of openings 322A of support member 204H. Similarly, length $1o$ can be adjusted by adjusting the location of joint 206S via the set of openings 304B of support member 204G. In various aspects, the ratio $$\frac{l_o}{l_r}$$

may be within a range of 5 to 9, though the ratio $$\frac{l_o}{l_r}$$

may be adapted to other suitable values greater than or equal to zero based on the application. The nonlinear inertia types that may be produced include high-compression-low-extension (HCLE), low-compression-high-extension (LCHE), and high-compression-high-extension (HCHE). In some aspects, HCLE corresponds to a ratio in the range of 6 to 7, such as 6.20. In some aspects, LCHE corresponds to a ratio in the range of 7 to 8, such as 7.10. In some aspects, HCHE corresponds to a ratio in the range of 8 to 9, such as 8.84.

The inventors also observed that, with respect to anti-vibration system 100, larger excitation leads to better vibration isolation performance in all cases. For instance, anti-vibration system 100 demonstrates smaller resonant & anti-resonant frequencies, smaller resonant peak values but the same high-frequency decay slope, the same anti-resonant peak value, and the same high-frequency band-suppression level when subjected to larger excitation, which means the anti-vibration system 100 demonstrates the same or better performance when the excitation amplitude is increased. Anti-vibration system 100 allows for larger excitation displacements due at least in part to the new and innovative nonlinear effects that are produced by the inertial structure 300 and configuration of support members 204A-N. Further, the inventors found that the nonlinear inertia force tends to be opposite to the equivalent stiffness force while the latter is the main factor for the fluctuation of interactive forces, which is particularly beneficial for vibration control. Additionally, the fluctuations of nonlinear spring force and damping force for the HCLE, LCHE, and HCHE nonlinear inertia types are all significantly smaller than a linear system due to the nonlinear inertia produced by anti-vibration system 100.

The inventors also performed a comparative test between a prototype of anti-vibration system 100 and a prototype without inertial structure 300. The prototype of anti-vibration system 100 had smaller resonant & anti-resonant frequencies, lower resonant peak values, and larger high-frequency decay slope but the larger high-frequency transmissibility, which means the inertial structure 300 of anti-vibration system 100 improves the nonlinear inertia and damping characteristics of the anti-vibration system 100.

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

Furthermore, all numerical ranges herein should be understood to include all integers, whole or fractions, within the range, inclusive of the ends of the ranges. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The above specification provide a complete description of the structure and use of illustrative embodiments of this invention. Although certain embodiments have been described above with a certain degree of particularity, or with reference to one or more individual embodiments, those of ordinary skill in the art could make numerous alterations to the disclosed embodiments without departing from the scope of this invention. As such, the various illustrative embodiments of the present apparatuses and methods are not intended to be limited to the particular forms disclosed. Rather, they include all modifications and alternatives falling within the scope of the claims, and embodiments other than those shown may include some or all of the features of the depicted embodiment. Further, where appropriate, aspects of any of the examples described above may be combined with aspects of any of the other examples described to form further examples having comparable or different properties or functions, and addressing the same or different problems. Similarly, it will be understood that the benefits and advantages described above may relate to one embodiment or may relate to several embodiments.

What is claimed is:

1. An anti-vibration system comprising:
a first support structure including a first support member and a second support member coupled to the first support member at a first joint such that the first and second support members are each rotatable about the first joint, wherein the first support member and the second support member cross over one another at the first joint;
a third support member coupled to the first and second support members and rotatable about an axis extending through the first joint; and
a first weighted member disposed at a first end portion of the third support member.

2. The anti-vibration system of claim 1, wherein the first weighted member is rotatable relative to the third support member about a second axis that is parallel to the axis extending through the first joint.

3. The anti-vibration system of claim 2, further comprising a second weighted member disposed at a second end portion of the third support member, wherein the second weighted member is rotatable relative to the third support member.

4. The anti-vibration system of claim 1, further comprising a second support structure coupled to the first support structure and the third support member.

5. The anti-vibration system of claim 4, wherein the second support structure includes a fourth support member and a fifth support member, wherein the fourth support member is rotatably coupled to the third support member and to the fifth support member.

6. The anti-vibration system of claim 5, wherein the fifth support member is further rotatably coupled to the first support member.

7. The anti-vibration system of claim 6, wherein the second support structure further includes a sixth support member rotatably coupled to the fifth support member and to the second support member.

8. The anti-vibration system of claim 1, further comprising a third support structure coupled to the first support structure and the third support member.

9. The anti-vibration system of claim 8, wherein the third support structure includes a seventh support member and an eighth support member, wherein the seventh support member is rotatably coupled to the third support member and to the eighth support member.

10. The anti-vibration system of claim 8, wherein the eighth support member is further rotatably coupled to the first support member.

11. The anti-vibration system of claim 10, wherein the second support structure further includes a ninth support member rotatably coupled to the eighth support member and to the second support member.

12. The anti-vibration system of claim 1, wherein the first weighted member and the second weighted member are equidistant from the first joint.

13. The anti-vibration system of claim 1, further comprising a resilient member disposed such that an end portion of the first support member is biased towards an end portion of the second support member.

14. An anti-vibration system comprising:
an X-shaped support structure that includes a first support member and a second support member;
a third support member rotatably coupled to the X-shaped support structure at a crossover point between the first and second support members;
a first weighted member disposed at a first end portion of the third support member; and
a second weighted member disposed at a second end portion of the third support member.

15. The anti-vibration system of claim 14, wherein a first axis about which the first and second support members rotate extends through the crossover point, wherein the first weighted member is rotatable relative to the third support member about a second axis, wherein the second weighted member is rotatable relative to the third support member about a third axis, and wherein the second axis and the third axis are each parallel to the first axis.

16. The anti-vibration system of claim 14, further comprising a fourth support member, a fifth support member, and a sixth support member, wherein: the fourth support member is rotatably coupled to the third support member and to the fifth support member, the fifth support member is further rotatably coupled to the first support member and to the sixth support member, and the sixth support member is further rotatably coupled to the second support member.

17. The anti-vibration system of claim 16, further comprising a seventh support member, an eighth support member, and a ninth support member, wherein: the seventh support member is rotatably coupled to the third support member and to the eighth support member, the eighth support member is further rotatably coupled to the first support member and to the ninth support member, and the ninth support member is further rotatably coupled to the second support member.

18. An anti-vibration system comprising:
a plurality of support members;
a first weighted member disposed at a first end portion of a first support member of the plurality support members such that the first weighted member is rotatable relative to the first support member; and
a second weighted member disposed at a second end portion of the first support member such that the second weighted member is rotatable relative to the second support member, and
wherein the plurality of support members are configured in an adjustable arrangement such that the nonlinear inertia generated by the anti-vibration system is adjustable.

19. The anti-vibration system of claim 18, wherein the nonlinear inertia generated is adjustable between high-compression-high-extension nonlinear inertia, high-compression-high-extension nonlinear inertia, and low-compression-high-extension nonlinear inertia.

20. The anti-vibration system of claim 18, wherein: the first support member is rotatable about an axis at a first joint in the adjustable arrangement, a second support member of the plurality of support members is rotatably coupled to the first support member at a second joint in the adjustable arrangement, and adjusting the nonlinear inertia generated by the anti-vibration system includes adjusting a length of the first support member that is between the first joint and the second joint.

* * * * *